US012638091B2

(12) United States Patent
Kotter et al.

(10) Patent No.: US 12,638,091 B2
(45) Date of Patent: May 26, 2026

(54) ELECTROCHEMICAL ENERGY STORE, MEANS OF TRANSPORT, CELL VENT AND METHOD FOR MANUFACTURING A CELL VENT

(71) Applicant: Bayerische Motoren Werke Aktiengesellschaft, Munich (DE)

(72) Inventors: Philip Kotter, Munich (DE); Simon Lux, Muenster (DE); Matthias Reichert, Ingolstadt (DE); Alexander Rheinfeld, Munich (DE); Sebastian Scharner, Tuerkenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/698,899

(22) PCT Filed: Oct. 5, 2022

(86) PCT No.: PCT/EP2022/077712
§ 371 (c)(1),
(2) Date: Apr. 5, 2024

(87) PCT Pub. No.: WO2023/078627
PCT Pub. Date: May 11, 2023

(65) Prior Publication Data
US 2024/0392885 A1 Nov. 28, 2024

(30) Foreign Application Priority Data
Nov. 3, 2021 (DE) ..................... 10 2021 128 528.3

(51) Int. Cl.
*F16K 17/40* (2006.01)
*F16K 17/16* (2006.01)
(Continued)

(52) U.S. Cl.
CPC .............. *F16K 13/04* (2013.01); *F16K 17/16* (2013.01); *F16K 17/1606* (2013.01);
(Continued)

(58) Field of Classification Search
CPC .... F16K 17/16; F16K 17/1606; F16K 17/162; F16K 17/403; F16K 17/383; F16K 17/38;
(Continued)

(56) References Cited

U.S. PATENT DOCUMENTS 47,869 A * 5/1865 Smith ................... F16K 17/162
220/89.2
2020/0136111 A1 4/2020 Jiang et al.

FOREIGN PATENT DOCUMENTS

CN 101184946 A * 5/2008 ........... B23K 26/359
DE 20 2016 105 275 U1 1/2018
(Continued)

OTHER PUBLICATIONS

International Search Report (PCT/ISA/210) issued in PCT Application No. PCT/EP2022/077712 dated Feb. 9, 2023 with English translation (5 pages).
(Continued)

*Primary Examiner* — Atif H Chaudry
(74) *Attorney, Agent, or Firm* — Crowell & Moring LLP

(57) ABSTRACT
The present disclosure is directed to an electrochemical energy store, a means of transport, a manufacturing method and a cell vent for an electrochemical energy store. In one form a cell vent comprises a first layer comprising a metal and a second layer comprising a first plastic, wherein the first layer and the second layer are arranged successively with respect to a pressure differential on the cell vent.

11 Claims, 2 Drawing Sheets

(51) Int. Cl.
    *F16K 17/38*          (2006.01)
    *H01M 50/342*      (2021.01)
    *H01M 50/375*      (2021.01)

(52) U.S. Cl.
    CPC ............ *F16K 17/38* (2013.01); *F16K 17/383*
          (2013.01); *F16K 17/403* (2013.01); *H01M*
        *50/3425* (2021.01); *H01M 50/375* (2021.01);
                  *H01M 2220/20* (2013.01)

(58) Field of Classification Search
    CPC . F16K 13/04; H01M 2200/10; H01M 50/375;
                       H01M 50/3425
    See application file for complete search history.

(56)                References Cited

FOREIGN PATENT DOCUMENTS

| | | | | |
|---|---|---|---|---|
| EP | 3444865 A1 * | 2/2019 | .......... | H01M 50/367 |
| WO | WO-2011042092 A1 * | 4/2011 | ........ | H01M 50/3425 |

OTHER PUBLICATIONS

German-language Written Opinion (PCT/ISA/237) issued in PCT Application No. PCT/EP2022/077712 dated Feb. 9, 2023 with English translation (7 pages).
German-language Search Report issued in German Application No. 10 2021 128 528.3 dated Sep. 19, 2022 with partial English translation (11 pages).

* cited by examiner

100

200

300

ELECTROCHEMICAL ENERGY STORE, MEANS OF TRANSPORT, CELL VENT AND METHOD FOR MANUFACTURING A CELL VENT

BACKGROUND AND SUMMARY

The present invention relates to an electrochemical energy store, a means of transport, a cell vent and a method for manufacturing a cell vent for an electrochemical energy store. The present invention relates in particular to improved protection of an electrochemical energy store from faults.

The electrification of private transport is currently progressing rapidly. One approach used for energy storage is that of using lithium-ion-based electrochemical energy stores. When there are faults within the cell or when there is external damage to the cell, the energy within the energy store may lead to failure. For example, in the case of thermal triggering (i.e. reaching a critical temperature), the separator shrinks/melts and leads to an extensive internal short-circuit of the cells (anode to cathode). At this moment, multiple exothermic reactions take place simultaneously in the cell (further shrinkage of the separator, decomposition and consequently oxygen release of the cathode, degradation of the protective layer of the anode, etc). This chain reaction may have the consequence that the gas produced in these reactions cannot be removed through the planned gas duct and the pressure relief valve (cell vent). Here in turn undesired side effects may occur, for example blocking of the cell vent by the stack or discharge, bulging or deforming of the cell before opening of the vent due to gas formation, etc. These undesired side effects have a strong influence on the propagation in the store, and consequently the safety of the vehicle.

It is therefore an object of the present invention to mitigate or eliminate the aforementioned disadvantages of the prior art in the event of faults. It is intended in particular to solve or prevent the problem of gas bubbles occurring in the ramp-up phase of the temperature and the associated effects such as jelly roll/stack movement or discharge or cell vent blockage. At the same time, it is intended to rectify the problem of water diffusion into the cell, in particular through the cell vent, or not to weaken measures against water diffusion into the cell.

The aforementioned object is achieved in particular by a two-stage temperature-sensitive cell vent being provided in the outer skin (housing) of an electrochemical energy store. This opens in the event of a thermal anomaly above a predefined temperature threshold, so that pressure can be reduced at an early stage if thermal triggering of the electrochemical energy store takes place. The early pressure reduction helps here to make the pressure reduction occur in an orderly fashion and in particular without the cell vent being blocked by component parts of the energy store.

Proposed according to a first aspect is a cell vent for an electrochemical energy store, which may be designed for example as a traction energy store for a means of transport. The electrochemical energy store may be constructed on the basis of lithium-ion technology. The cell vent comprises a first layer with a metal or of a metal. The metal may for example be or comprise aluminum. The first layer closes a housing opening of the electrochemical energy store that is intended for a pressure reduction in the event of a thermal and/or pressure-related anomaly.

Additionally provided is a second layer, comprising a plastic, which likewise closes the electrochemical energy store or its pressure reduction opening. The second layer may in particular be made entirely of plastic or be produced from the first plastic. The first layer and the second layer are arranged in the same opening of the electrochemical energy store. At the same time, they lie one behind the other with respect to a pressure differential at the cell vent or one behind the other with respect to a direction of flow through the cell vent after an opening or response of the cell vent. It could also be said that the first layer and the second layer are arranged lying in series one behind the other. The fact that the plastic of the second layer responds earlier in the event of thermal triggering than the first layer means that the second layer can be weakened earlier in the event of thermal triggering than was the case in the prior art with just a first layer in the cell vent. The fact that the first layer and the second layer are arranged in series one behind the other means that the first layer can be supported against a pressure within the electrochemical energy store by the second layer, as long as it is intact. This means that the first layer can be made thinner than in the prior art. This in turn means that, after a response of the second layer to a predefined temperature within the electrochemical energy store, the full pressure difference exerts a load on the first layer and also this layer can respond earlier than was the case in the prior art. Consequently, a pressure reduction in the course of a failure due to thermal triggering can be performed better and unforeseen occurrences in the case of outflow of gas and material from the electrochemical energy store can be avoided.

The dependent claims illustrate further implementations of the invention.

The cell vent may have a predetermined breaking point, which is for example arranged within the first layer. For this purpose, the cell vent may have a predefined weakening in the manner of a trench or a slit. In order to prevent water diffusion through the predetermined breaking point, a third plastic may be provided in the region of the predetermined breaking point, representing a barrier to diffusing water vapor but not compensating entirely for the mechanical losses in strength intended by the predetermined breaking point. In order to produce a sufficiently large opening in the housing of the electrochemical energy store in the event of a response of the predetermined breaking point, the predetermined breaking point may have the form of a ring. In particular, the ring form may be adapted to the housing opening in such a way that the ring is arranged in an outer region of the first layer or extends along a wall of the opening in the housing. At the same time, the ring form of the predetermined breaking point may have an interruption, whereby, after the response of the predetermined breaking point, the partly detached region is still connected to the remaining regions of the first layer, so that part of the first layer is prevented from falling into the energy store or its housing. A corresponding design is known in the case of beverage cans.

If the first plastic has a lower temperature resistance than the third plastic, it is ensured that the second layer yields first in the event of thermal triggering, so that subsequently the entire pressure and the entire heat of the reactions within the electrochemical energy store act on the third plastic and at the same time further weaken the predetermined breaking point. Subsequently, the first layer also yields, but at a lower internal cell pressure than in the prior art, so that unforeseen occurrences and a blockage of the cell vent are less probable.

In some implementations, a cell vent according to the invention may, for example, respond at temperatures from 70° C., from 80° C., from 90° C. or from 100° C. and at least partly expose an opening in the electrochemical energy store. Alternatively or additionally, the aforementioned temperature ranges may only concern one of the two layers. In principle, the temperature resistance may also be chosen to be somewhat higher, so that temperatures up to 110° C. or 120° C. are required to open the first layer and/or the second layer of the cell vent. The first layer and the second layer of the cell vent are together capable of withstanding a gas pressure of 7 to 15 bar in each case and opening/tearing from a gas pressure of 7 to 15 bar. The predetermined breaking point in the first layer may in particular be made 100 to 150 micrometers thick, so that when aluminum is used a pressure resistance in the range of 7 to 15 bar is achieved.

The first layer and the second layer may be arranged lying directly one on top of the other. For example, they may be laminated and/or adhesively bonded one on top of the other. In particular, they may be adhesively bonded to one another by the effect of heat. Alternatively, the first layer may be made separate from the second layer, so that there may be a gas or a fluid between the two layers as a barrier to water diffusion. For example, an oil or some other suitable substance may represent a further barrier with respect to water diffusion, without the filler imparting any appreciable tensile strength or temperature resistance. The design of the cell vent against overpressure and overtemperature is consequently scarcely influenced by the substance.

The second layer may in particular be set up to resist a lower maximum gas pressure in the electrochemical energy store than the first layer. In other words, when the gas pressure in the electrochemical energy store rises, first the second layer will yield, in response to which the entire gas pressure exerts a load on the first layer. In this way, a two-stage opening of the cell vent can be achieved, whereas between the two stages a volume possibly arranged between the two layers leads to an interim pressure reduction of the internal cell pressure and further reduces the probability of an explosive opening of the cell vent.

The second layer may have an inlay of a second plastic, which has a multiplicity of openings. For example, the inlay may represent a netting or a gauze or the like, which is produced from the second plastic. The openings of the netting or gauze are then closed by the first plastic, which in the event of thermal triggering exposes the openings individually or progressively. On the one hand, as a result the pressure reduction can take place gradually, on the other hand the inlay can prevent foreign bodies, in particular component parts of the first layer, from getting into the interior of the cell. Moreover, the inlay of the second plastic allows a mechanical (pressure) stability to be made substantial independent of a thermal resistance of the second layer.

In particular, the first plastic may also have a lower temperature resistance than the second plastic. Consequently, the inlay can survive even when there are higher temperatures, so that the aforementioned advantages can also be achieved at these higher temperatures.

In particular, the temperature resistance of the second plastic may be higher than the temperature resistance of the first plastic and the third plastic, whereas the temperature resistance of the third plastic is between the temperature resistance of the first plastic and the second plastic. In this way, a thermal response of the two layers can be ensured, whereas the inlay of the second plastic continues to protect the opening against the ingress of foreign bodies.

Proposed according to a second aspect of the present invention is a method for manufacturing a cell vent such as that which has already been described in detail above in conjunction with the first-mentioned aspect of the invention. In a manufacturing method, the first layer and the second layer may be punched out from a respective sheet. For this purpose, the two sheets may first be laid one on top of the other and subsequently the first layer and the second layer created for the cell vent by a single punching operation. Depending on the design, further layers or materials/substances may be arranged between the first sheet and the second sheet, and they subsequently remain between the first layer and the second layer for example even in the cell vent until a fault occurs. For example, an oil, a grease, an adhesive or further sheets may be arranged between the first sheet and the second sheet, and they subsequently remain there, arranged between the first layer and the second layer. In the course of the punching out, the first layer and the second layer may also be connected (for example thermally) to one another. In particular in the edge regions, a pinching process may generate thermal energy and/or frictional forces between the first layer and the second layer in the course of the punching out. In a further step, an opening in a cell housing of an electrochemical energy store is closed by means of the first layer and the second layer. At the same time, for example the first layer in particular may be secured in the opening by means of laser welding and/or friction welding. At the same time, a metallic connection may be established between the first layer and the opening or the housing of the electrochemical energy store. This may be a material-bonding connection. If the second layer does not have a sufficiently high temperature resistance for a laser-welding operation (or laser welding is not desired for other reasons), the second layer may be connected to the opening of the cell housing in a separate joining step. For example, a friction-welding operation, an adhesive-bonding operation or the like may take place before or after the mounting of the first layer. Alternatively or additionally, a clamping of the first layer and/or the second layer in the region of the opening (for example by a ring seal or a ring flange) may secure the first layer and the second layer with respect to the housing, and consequently reliably close the volume located in the cell housing until the occurrence of a fault.

Proposed according to a third aspect is an electrochemical energy store, for example a traction battery for a means of transport, which has at least one cell vent according to the first-mentioned aspect of the invention. The electrochemical energy store may have storage cells, the energy of which when there is a fault can be reduced by the cell vent according to the invention. The features, combinations of features and advantages arising from them clearly correspond to those of the cell vent according to the invention in such a way that, to avoid repetition, reference is made to the above statements.

Proposed according to a fourth aspect of the present invention is a means of transport, which has an electrochemical energy store according to the third-mentioned aspect of the invention or a cell vent according to the first-mentioned aspect of the invention. To avoid repetition, reference is made to the above statements also with respect to the features, combinations of features and advantages of the means of transport according to the invention.

BRIEF DESCRIPTION OF THE DRAWINGS

Further details, features and advantages of the invention emerge from the following description and the figures, in which.

Figure 2:
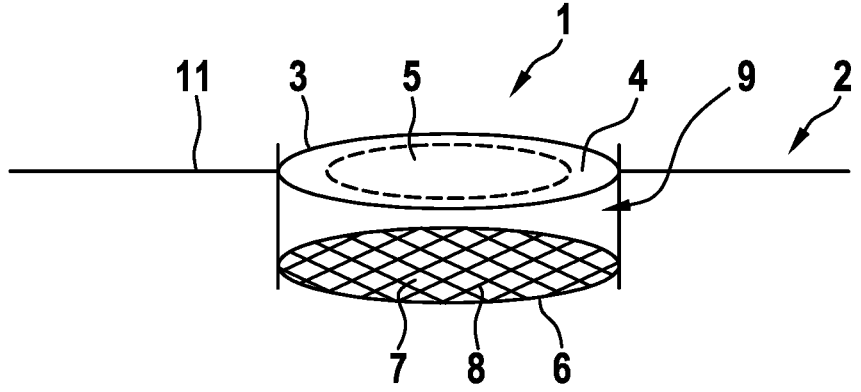
Figure 3:
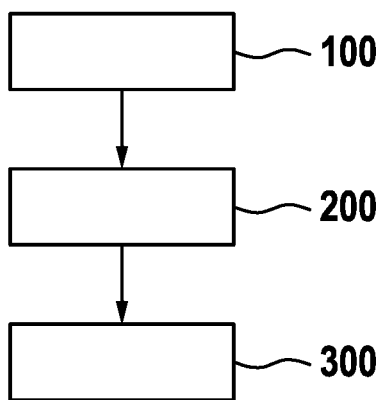

5 tion with an exemplary embodiment of an electrochemical energy store according to the invention with an exemplary embodiment of a cell vent;

FIG. 2 shows a perspective view of a detail of an exemplary embodiment of the cell vent; and FIG. 3 shows steps of an exemplary embodiment of the method for manufacturing a cell vent.

DETAILED DESCRIPTION OF THE DRAWINGS

Figure 1:
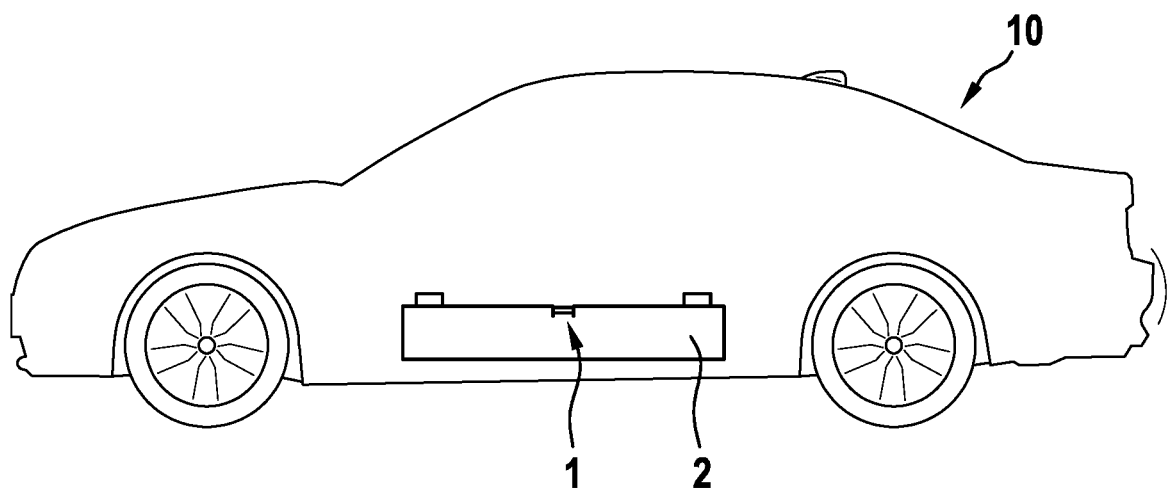
FIG. 1 shows a schematic representation of an exemplary embodiment of a means of transport according to the inven-

FIG. 1 shows an electrically driveable passenger car as a means of transport 10, which has a traction energy store as electrochemical energy store 2. For reducing an overpressure when there is a fault, the electrochemical energy store 2 is protected by a cell vent 1, which is described in detail in FIG. 2.

FIG. 2 shows an electrochemical energy store 2, in the housing 11 of which a cell vent 1 is installed. The cell vent 1 comprises in an opening 9 a first layer 3 and, lying thereunder, a second layer 6, so that the layers 3, 6 are arranged lying one behind the other. At the same time, the second layer 6 is arranged closer to the interior of the cell than the first layer 3. The first layer 3 has a membrane of metal 4, which has an annular predetermined breaking point, comprising a third plastic 5. When the third plastic 5 melts or otherwise yields, a circular opening within the first layer 3 is exposed for the escape of gas and material. The second layer 6 has a mesh of a second plastic 8 and has a first plastic 7 coating the mesh and closing the openings in the mesh. The first plastic 7 has comparatively little temperature resistance, so that, of the materials presented, it is the first to yield in the event of a thermal triggering. As a result, openings in the mesh of the second plastic 8 are exposed and, as a consequence, the first layer 3 is subjected to thermal and pressure-related loading. As soon as the predetermined breaking point in the form of the third plastic 5 has responded, gas and material can escape substantially unhindered and blocking of the opening 9 does not have to be feared because of the prompt response of the cell vent 1.

FIG. 3 shows steps of a method for manufacturing a cell vent 1 such as that which has been presented in detail in FIG. 2. In a first step 100, the first layer is punched out from a first sheet. In a second step 200, the second layer is punched out from a second sheet. For this purpose, the first sheet and the second sheet may first be laid one on top of the other and punched out in a common punching step. In other words, the steps 100 and 200 may be performed at the same time or one after the other in time (in any desired sequence). In step 300, an opening in a cell housing for an electrochemical energy store is closed by means of the first layer and the second layer. For this purpose, a heat input which seals the first layer and the second layer fluid-tightly to the opening of the electrochemical energy store is chosen in the edge region of the first layer and the second layer. The second layer is arranged closer to the interior of the cell, and consequently placed between the storage cells and the first layer.

LIST OF REFERENCE SIGNS

1 Cell vent
2 Electrochemical energy store
3 First layer
4 Metal
5 Third plastic
6 Second layer

6

7 First plastic
8 Second plastic
9 Opening
10 Means of transport
11 Housing
100 to 300 Method steps

What is claimed is:

1. A cell vent for an electrochemical energy store, comprising:
   a first layer comprising a metal; and
   a second layer comprising a first plastic;
   wherein the first layer and the second layer being arranged lying one behind the other with respect to a pressure differential at the cell vent; and
   wherein the first layer has a predetermined breaking point comprising a third plastic.

2. The cell vent of claim 1, wherein the first layer has a predetermined breaking point in the form of a ring.

3. The cell vent of claim 1, wherein the first plastic has a lower temperature resistance than the third plastic.

4. The cell vent of claim 1, wherein the first layer and the second layer are at least one of laminated or adhesively bonded directly one on top of the other.

5. The cell vent of claim 1, wherein the first layer and the second layer are arranged separately from one another.

6. The cell vent of claim 1, wherein the second layer is configured to resist a smaller maximum gas pressure in the electrochemical energy store than the first layer.

7. The cell vent of claim 1, wherein the second layer comprises an inlay of a second plastic, which has a multiplicity of openings closed by the first plastic.

8. The cell vent of claim 7, wherein the first plastic has a lower temperature resistance than the second plastic.

9. A method for manufacturing a cell vent for an electrochemical energy store, comprising: a first layer comprising a metal; and a second layer comprising a first plastic, wherein the first layer and the second layer being arranged lying one behind the other with respect to a pressure differential at the cell vent, and wherein the first layer has a predetermined breaking point comprising a third plastic, the method comprising:
   punching out the first layer from a first sheet;
   punching out the second layer from a second sheet;
   closing an opening in a cell housing for an electrochemical energy store by means of the first layer and the second layer, the second layer being arranged between the first layer and an interior of the cell housing.

10. An electrochemical energy store, comprising:
   a cell vent, comprising
      a first layer comprising a metal; and
      a second layer comprising a first plastic;
      wherein the first layer and the second layer being arranged lying one behind the other with respect to a pressure differential at the cell vent; and
      wherein the first layer has a predetermined breaking point comprising a third plastic.

11. A means for transport comprising a cell vent for an electrochemical energy store, the cell vent comprising:
   a first layer comprising a metal; and
   a second layer comprising a first plastic;
   wherein the first layer and the second layer being arranged lying one behind the other with respect to a pressure differential at the cell vent; and
   wherein the first layer has a predetermined breaking point comprising a third plastic.

* * * * *